July 2, 1940.   L. M. BECKWITH   2,206,444
GUARD FOR AUTOMOBILES
Filed Sept. 20, 1938
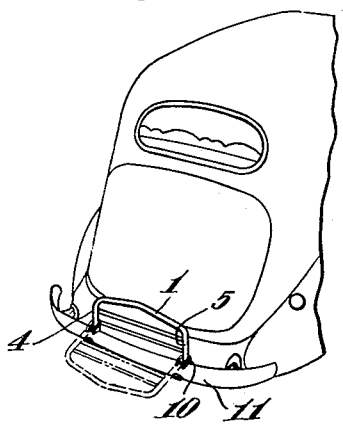
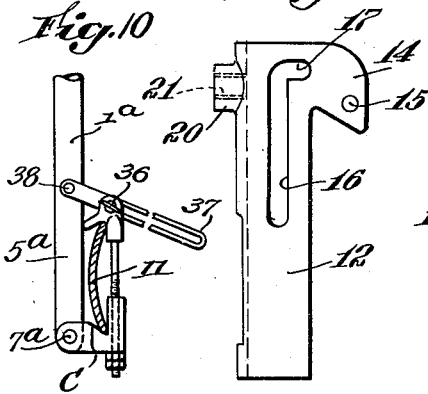
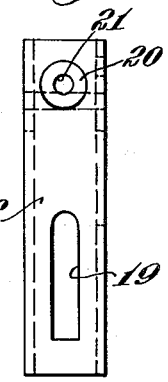
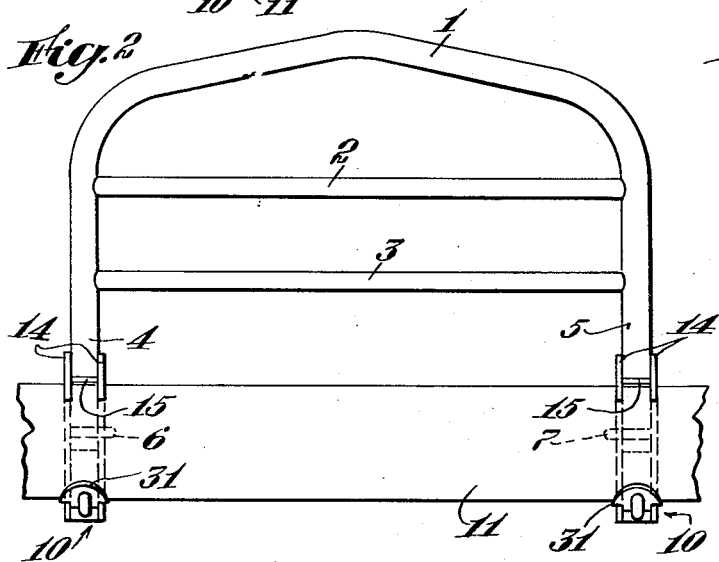
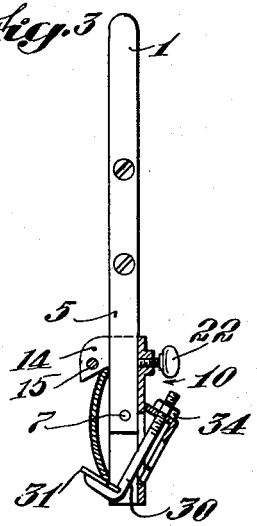
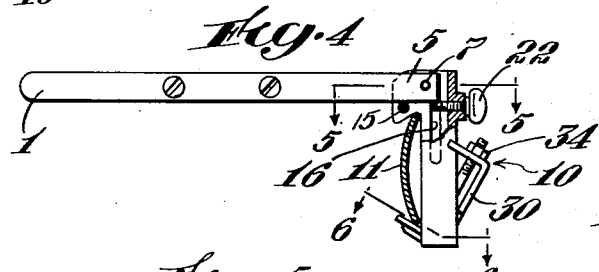
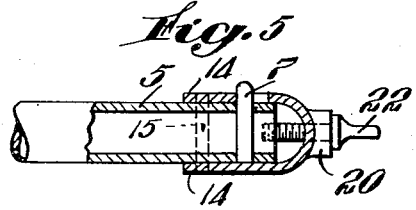
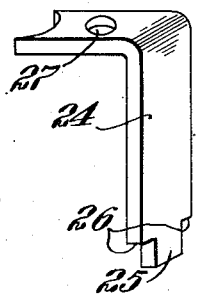
Inventor
Leo M. Beckwith
by Roberts, Cushman & Woodbury
his Attys.

Patented July 2, 1940

2,206,444

UNITED STATES PATENT OFFICE 2,206,444

GUARD FOR AUTOMOBILES

Leo M. Beckwith, Brookline, Mass., assignor to Market Forge Co., Everett, Mass., a corporation of Massachusetts Application September 20, 1938, Serial No. 230,840

14 Claims. (Cl. 293—55)

This invention relates to a guard of the type adapted to be attached to the bumper of an automobile so as to afford protection to the rear of the body or fixtures mounted thereon.

The principal object of the invention is to provide a guard of the aforementioned type which may be quickly converted into a luggage carrier by a simple manipulation, and which is of an attractive appearance and of strong and durable construction, embodying a minimum number of parts, and which may be readily attached to a bumper of any of the more usual types.

Further objects relate to various features of construction and will be apparent from a consideration of the following description and accompanying drawing, wherein:

Fig. 1 is a perspective view of the rear of an automobile having a convertible guard constructed in accordance with the present invention;

Fig. 2 is an elevational view showing the guard attached to a bumper and disposed in an upstanding position;

Fig. 3 is an end elevation, with parts broken away and shown in section, of the guard positioned as shown in Fig. 2;

Fig. 4 is a view similar to Fig. 3, but showing the guard disposed in the horizontal position to provide a luggage carrier;

Fig. 5 is an enlarged section on the line 5—5 of Fig. 4;

Fig. 6 is an enlarged section on the line 6—6 of Fig. 4;

Figs. 7 and 8 are side and front elevations of the socket element constituting the fixed jaw member of one of the clamps;

Fig. 9 is a perspective view of an element constituting a part of the clamp; and Fig. 10 is a diagrammatic view generally similar to Fig. 3 but showing a modification.

In accordance with the present invention I provide a guard or shield having clamping members by means of which the guard may be firmly secured to a rear bumper of an automobile, the clamping members being so designed that the guard may either be rigidly held in an upstanding position, thereby to afford protection to the body of the car and/or fixtures mounted thereon, or swing to a horizontal position wherein it provides a luggage carrier.

In the embodiment chosen for illustration, the guard member comprises a frame 1 which, when the guard is upright, is of generally inverted U-shape, the guard also having spaced crossbars 2 and 3 which are rigidly secured in any suitable manner to the legs 4 and 5 of the frame member 1. The end portions of the legs 4 and 5 are provided with pins 6 and 7, each of which extends inwardly, as shown more clearly in Fig. 2. The frame member and crossbars preferably consist of chromium plated metal tubing, although if desired any other suitable material having an appropriate finish may be employed. The guard 1 is pivotally supported by a pair of clamping members, designated by the numeral 10, each of which may be rigidly secured to the bumper 11 of an automobile or the like vehicle, as illustrated in Fig. 1. Each of the clamping members or assemblies comprises a socket device 12 (Figs. 7 and 8) of substantially U-shape in horizontal section and whose open side, when the device is in use, is closed by the bumper of the automobile thereby to form a vertically elongate socket of substantial depth adapted slidably to receive one of the respective legs 4 and 5 which form parts of the side rails of the guard frame.

Each of the socket devices is formed in its upper ends with a pair of laterally extending nose pieces 14 which provide a fixed jaw engageable with the upper edge of the bumper 11, as shown in Figs. 2 to 4, and adjacent to their outer ends the nose pieces 14 are connected by a supporting pin 15, the utility of which is hereinafter pointed out. The inner side wall of each socket member is formed with an inverted L-shaped slot comprising the elongate vertical portion 16 and the horizontal upper portion 17 (Fig. 7), portions 16 and 17 being designed to receive the pivot pins when the clamps 10 are secured to spaced locations on a curved or arcuate-shaped bumper. Preferably the slots 16 are of a width somewhat exceeding the diameters of the pins to facilitate the application of the device to a bumper which is curved in a horizontal plane such that the axes of the spaced pivot pins are not exactly aligned. Further, in order to facilitate the application of the device to a curved bumper, the nose pieces 14 are preferably somewhat flexible so that they may be twisted slightly to insure proper engagement with the edge of the bumper. The outer face of each socket member is formed with an elongate opening 19 (Fig. 8) adjacent to its lower end, and the outer face of one or both of the socket members may be provided with a boss 20 (Figs. 7 and 8) formed with a threaded aperture 21 which receives a set screw 22 or the like fastening element, as shown in Figs. 3 to 5.

An inverted L-shaped member 24 (Fig. 9) fits against the outer face of each socket member 12, its lower end being cut away to form a neck 25 which projects into the opening 19 and shoulders 26 which engage the edges of the opening 19, as shown in Figs. 3 and 4. The opposite end of the member 24 is of arcuate form so as to fit against the outer face of the socket member between the boss 20 and the upper end of the opening 19, and adjacent to its arcuate end the member 24 is formed with an aperture 27 which receives the threaded upper end of the movable or adjustable jaw 30 of the clamp 10. The jaw 30 consists of an L-shaped member whose lower end is provided with a flat plate 31 (Figs. 3 and 6) which is engageable with the lower edge of the bumper 11 and effective to prevent the clamp from tipping when tightened. Each of the movable jaws 30 may be adjustably secured in assembled relation with the bumper 11 by a nut 34 (Figs. 3 and 4) carried by its threaded end.

In attaching the device to a bumper or the like support, the assembled clamping members are first applied to each leg of the guard 1 so that the pins 6 and 7 extend into the slots 16, and the assemblage is then applied to the inner face of the bumper so that the fixed jaws or nose pieces 14 engage its upper edge. The lower jaws may then be manipulated so that they engage the lower edge of the bumper and with the parts thus positioned (Figs. 2 to 4) the nuts 34 may then be tightened so that the movable jaws 30 firmly clamp the bumper 11. In thus applying the clamp it is not necessary to introduce bolts into holes or apply nuts to bolts, but only to tighten the nut 34 already assembled with the other parts, so that the clamp is easily and very quickly secured in place.

When the set screw 22 is in fully retracted position, the guard 1 may be positioned so that its legs 4 and 5 extend well into the socket members 12 with the pins 6 and 7 disposed at the lower ends of the slots 16, and when the parts are so disposed the set screw 22 may be tightened, thereby to prevent the parts from rattling. When thus positioned the device provides a guard or shield for the rear of the vehicle, as illustrated by the full lines of Fig. 1. By loosening the set screw 22 and lifting the frame member 1 upwardly until the leg members 4 and 5 disengage the sockets and the pins 6 and 7 ride into the horizontal portions 17 of the respective slots, the guard may then be swung downwardly about the pivot pins to a horizontal position, as shown by the dot and dash lines of Fig. 1, thus providing a luggage carrier. When thus positioned the legs of the frame member are firmly supported by the cross pins 15 and the frame member then may be kept from rattling by operating the set screws 22 so that their inner ends engage the under surfaces of the ends of the legs 4 and 5, as shown in Figs. 4 and 5. By retracting the set screws the guard may be swung upwardly and repositioned as shown in Fig. 3.

It will be noted that in a convertible guard constructed in accordance with the present invention, the clamping devices are substantially concealed from view and hence do not detract from the appearance of the vehicle. It will be further noted that the guard may be easily and quickly converted into a luggage carrier and repositioned by a few simple manipulations, and also that since the guard may be quickly swung from its vertical or upstanding position, it does not interfere with ready access to the luggage compartment.

In Fig. 10 the clamp C may be of the same general type as above described and is secured to the bumper 11 in the same way. However, the clamp C has a pivot pin 7ᵃ at the lower part to which the lower end of the leg 5ᵃ of the guard 1ᵃ is secured. To hold the guard 1ᵃ either in upright or horizontal position as desired, the bracket is furnished with a clamping screw 36, which passes through an elongate slot in a brace bar 37 pivoted at 38 to the leg 5 at a substantial distance from the pivot pin 7ᵃ. By loosening the screw 36, the guard 1 may be swung about pivot 7ᵃ and by tightening the nut it may be held in any desired adjusted position.

While I have shown and described one desirable embodiment of the invention, it is to be understood that this disclosure is for the purpose of illustration and that various changes in shape, proportion and arrangement of parts, as well as the substitution of equivalent elements for those herein shown and described, may be made without departing from the spirit and scope of the invention as set forth in the appended claims.

I claim:

1. A device of the class described comprising a rigid frame adapted when in upstanding position to constitute a guard and when in substantially horizontal position to form a luggage carrier, the frame comprising spaced substantially parallel side rails terminating in leg members, a pair of socket devices having vertically elongate sockets into which the leg portions of the frame fit when the frame is in upstanding position, means for clamping each of the socket devices to the bumper of an automobile, said socket devices each having an inverted L-shaped slot which receives a pin projecting from the respective leg of the frame, the pins being disposed in the vertical portions of the slots when the frame is in upstanding position but occupying the horizontal portions of the slots when the frame is horizontally disposed, and supporting means carried by the socket devices for supporting the frame in horizontal position, the frame being movable from vertical to horizontal position only when the frame has been lifted sufficiently to disengage its legs from the respective sockets.

2. A device of the class described comprising a rigid frame adapted when in upstanding position to constitute a guard and when in a substantially horizontal position to form a luggage carrier, said frame having spaced substantially parallel leg members, and a pair of clamping assemblies for securing the frame to the bumper of an automobile, each assembly including a socket device having a substantially vertical elongate socket in which one of the respective legs of the frame fits when the frame is in upstanding position, each clamping assembly comprising releasable means operative removably to clamp its respective socket device to the bumper of the automobile, the depth of the sockets and the lengths of the legs of the frame being such as rigidly to hold the frame in upstanding position when the legs are seated in the sockets, the frame being movable to horizontal position only when lifted to such an extent as to disengage its legs from the sockets, the socket device comprising means for supporting the frame in horizontal position, and means operative to prevent complete disengagement of the legs from the socket devices when shifting the frame from vertical to horizontal position.

3. A device according to claim 2 wherein the side rails are movably connected to the clamping assemblies by pin and slot connections affording pins about which the frame may swing from upstanding to horizontal position.

4. A device according to claim 2 wherein the side rails are movably connected to the clamping assemblies by pin and slot connections affording pins about which the frame may swing from upstanding to horizontal position and wherein the slots afford guides substantially paralleling the paths of the side rail ends as they are lifted from the sockets.

5. A device according to claim 2 wherein each clamping assembly is provided with a single clamping screw arranged to be tightened to prevent rattling of the side rail ends in the sockets, and arranged to cooperate with other parts of the clamping assembly positively to hold the frame in horizontal position.

6. A device of the class described comprising a frame adapted when in upstanding position to constitute a guard and when in a substantially horizontal position to form a luggage carrier, said frame having spaced substantially parallel leg members, and a pair of clamping assemblies for securing the opposite sides of the frame to the bumper of an automobile or the like, each of said clamping assemblies including a member having an inverted L-shaped guide slot therein, each of said leg members of the frame having a pivot pin projecting therefrom into one of said guide slots respectively, and about which the frame may be swung from an upright to a substantially horizontal position, and means operative to prevent such swinging of the frame so long as said pins occupy the vertical portions of the respective guide slots.

7. A device of the class described comprising a frame adapted when in upstanding position to be a guard and when in a substantially horizontal position to be a luggage carrier, a pair of clamping assemblies for securing the opposite sides of the frame to the bumper of an automobile or the like, the frame having opposite side rails movably connected to said assemblies, each of said clamping assemblies cooperating with the corresponding side rail in affording a pin and slot connection, including a pin about which the corresponding side rail may swing and a substantially rectilinear slot defining an upwardly extending path for the side rail as the frame is moved from upstanding to horizontal position, a lateral extension of said slot being arranged to receive said pin when the frame is in horizontal position.

8. A device of the class described comprising a frame adapted when in upstanding position to constitute a guard and when in a substantially horizontal position to form a luggage carrier, said frame comprising substantially parallel leg members, and a pair of clamping assemblies for securing the frame to the bumper of an automobile, each of said clamping assemblies including means operative removably to secure the assembly to the bumper of an automobile and each of said assemblies including a socket member of substantially U-shape in horizontal cross section whose open side is closed by the inner surface of the bumper when the device is in operative position, thereby forming a vertically elongate socket in which one of the respective legs of the frame fits when the frame is in its upstanding position.

9. A device of the class described comprising a frame adapted when in upstanding position to be a guard and when in a substantially horizontal position to be a luggage carrier, a pair of clamping assemblies for securing the opposite sides of the frame to the bumper of an automobile or the like, the frame having opposite side rails movably connected to said assemblies, each of said assemblies providing a socket member of substantially U-shaped cross section to cooperate with the inner face of the bumper in affording a socket in which the end of the corresponding side rail may fit when the frame is in its upstanding position, said member having a portion to hook over one edge of the bumper, and a cooperating clamp to hook over the opposite edge of the bumper and adjustably connected to the socket member.

10. A device of the class described comprising a frame adapted when in upstanding position to be a guard and when in a substantially horizontal position to be a luggage carrier, a pair of clamping assemblies for securing the opposite sides of the frame to the bumper of an automobile or the like, the frame having opposite side rails movably connected to said assemblies, each of said assemblies providing a socket member of substantially U-shaped cross section to cooperate with the inner face of the bumper in affording a socket in which the end of the corresponding side rail may fit when the frame is in its upstanding position, said member having a portion to hook over one edge of the bumper, and a cooperating clamp to hook over the opposite edge of the bumper and adjustably connected to the socket member, said socket member having a pin and slot connection with the corresponding side rail, said portion of the socket member providing a stop to engage the frame in horizontal position and cooperate with said connection in limiting downward swinging movement of the frame.

11. A device of the class described comprising a frame adapted when in upstanding position to be a guard and when in a substantially horizontal position to be a luggage carrier, a pair of clamping assemblies for securing the opposite sides of the frame to the bumper of an automobile or the like, the frame having opposite side rails movably connected to said assemblies, each of said assemblies providing a socket member of substantially U-shaped cross section to cooperate with the inner face of the bumper in affording a socket in which the end of the corresponding side rail may fit when the frame is in its upstanding position, said member having a portion to hook over one edge of the bumper, and a cooperating clamp to hook over the opposite edge of the bumper and adjustably connected to the socket member, said socket member having a pin and slot connection with the corresponding side rail, said portion of the socket member providing a stop to engage the frame in horizontal position and cooperate with said connection in limiting downward swinging movement of the frame, and a clamp screw cooperating with said stop and connection in positively locking the frame in its horizontal position.

12. A device of the class described comprising a frame adapted when in upstanding position to be a guard and when in a substantially horizontal position to be a luggage carrier, a pair of clamping assemblies for securing the opposite sides of the frame to the bumper of an automobile or the like, the frame having opposite side rails movably connected to said assemblies, each of said assemblies providing a socket member of substantially U-shaped cross section to cooperate with the inner face of the bumper in affording a socket in which the end of the corresponding side rail may fit when the frame is in its upstanding position, said member having a portion to hook over one edge of the bumper, and a cooperating clamp to hook over the opposite edge of the bumper and adjustably connected to the socket member, said clamp having a shank portion extending through a slot in the back of the socket member and extending diagonally relative to said member, the clamp providing an angular retainer having abutment surfaces to engage the back of said member at opposite sides of the shank.

13. A device of the class described comprising a frame adapted when in upstanding position to be a guard and when in a substantially horizontal position to be a luggage carrier, a pair of clamping assemblies for securing the opposite sides of the frame to the bumper of an automobile or the like, the frame having opposite side rails movably connected to said assemblies, each of said assemblies providing a socket member of substantially U-shaped cross section to cooperate with the inner face of the bumper in affording a socket in which the end of the corresponding side rail may fit when the frame is in its upstanding position, said member having a portion to hook over one edge of the bumper, and a cooperating clamp to hook over the opposite edge of the bumper and adjustably connected to the socket member, said clamp having a threaded shank portion extending through a slot in the back of the socket member and extending diagonally relative to said member, said member having a slot therein through which the shank extends, the clamp providing a retainer with an upper portion engaging the back of said member and a lower portion engaging said slot.

14. A device of the class described comprising a frame adapted when in upstanding position to constitute a guard and when in a substantially horizontal position to form a luggage carrier, said frame comprising substantially parallel leg members, a pair of clamping assemblies for securing the frame to the bumper of an automobile, each assembly comprising means for securing it to the bumper of the automobile, each assembly including a socket device designed to receive one of the respective legs of the frame when the frame is in upstanding position, said sockets being of such depth as to preclude swinging of the frame from its upstanding position until the frame has been lifted, while still in upstanding position, until its legs are freed from the sockets, and means operative to constitute pivots for the frame when in its elevated position about which it may be swung downwardly substantially to horizontal position, each assembly comprising means for supporting the frame in such horizontal position.

LEO M. BECKWITH.